United States Patent Office 2,895,408
Patented July 21, 1959

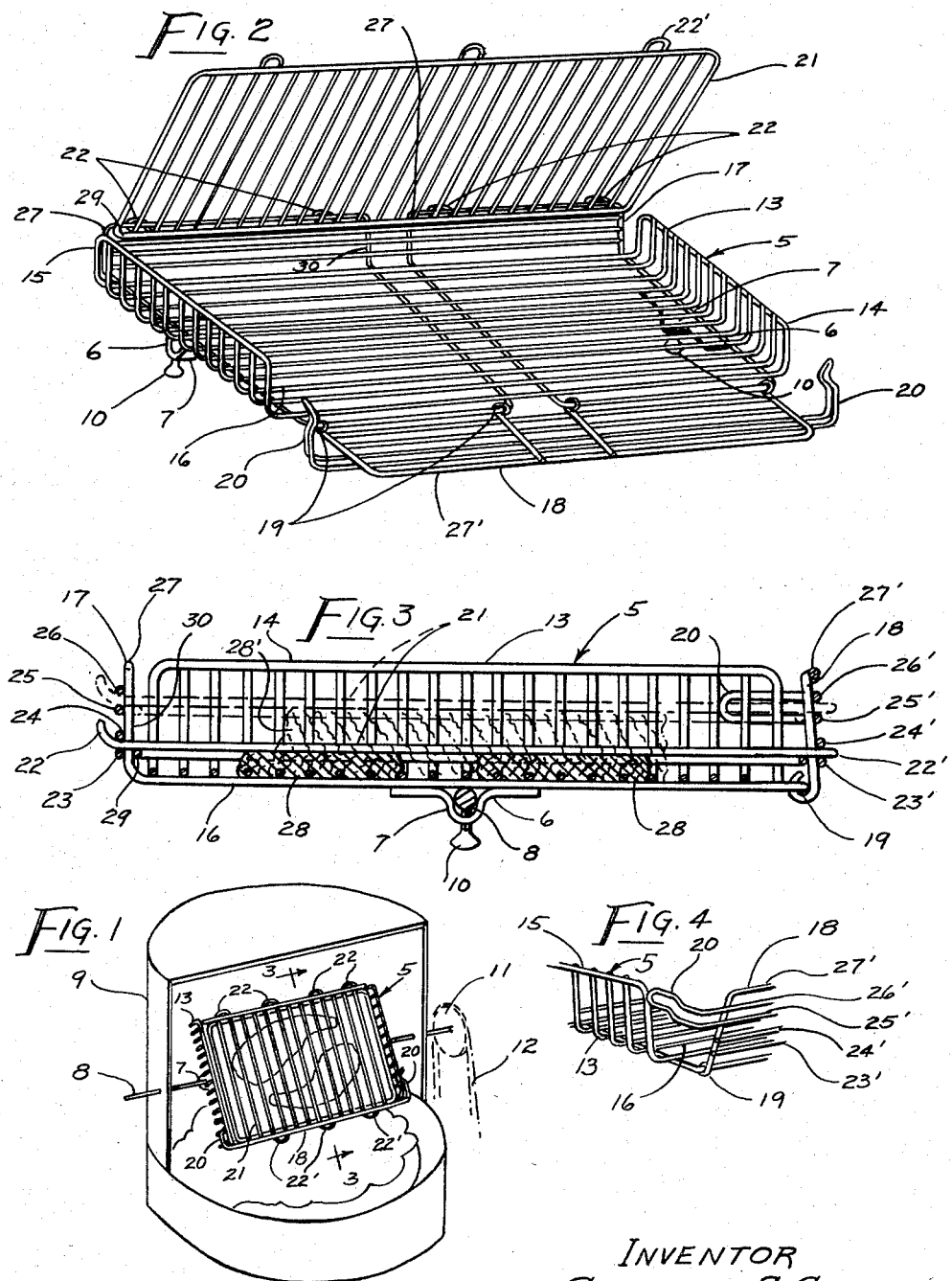

2,895,408

SPIT BASKET

Clarence S. Glenny, Rockford, Ill., assignor to The Washburn Company, Worcester, Mass., a corporation of Massachusetts Application February 27, 1957, Serial No. 642,712

10 Claims. (Cl. 99—427)

This invention relates to a new and improved spit basket designed for attachment to the rotary spit bar of a grill for the uniform barbecuing of chops, cut-up chicken, hamburgers, frankfurters, fish and steaks.

The principal object of this invention is to provide a spit backet designed for quick and easy attachment to a spit bar and having one side easily adjustable to suit the thickness of the meat to be barbecued, so that the pieces are not apt to shift about but each is held adequately to remain in spaced relation to neighboring pieces and all are therefore assured of the same uniform barbecuing.

In the spit basket of my invention, a detachable top wire panel is provided adapted to be assembled on the basket in either of five positions of differently spaced parallel relationship with respect to the bottom of the basket. The opposite end walls and the back wall of the basket are fixed and the front wall is hinged and has a locking means for securing it in closed position so that the food cannot fall out when the top is applied to the basket between the fixed back and hinged front thereof. Wire snap locks are preferably provided on opposite ends of the hinged front wall and these have snap engagement on the upright wires on the fixed end walls of the basket. The spit bar is disposed outside the basket on the longitudinal center line of the bottom so that there is no interference with food placed in the basket and no problem of attaching the basket to various models of manually and motor-driven spit bars, the only necessity being that the bar is small enough to be entered through eyes provided therefor in alignment on the bottom of the basket.

The invention is illustrated in the accompanying drawing, in which—

Fig. 1 is a perspective view of a motorized grill, the rotary spit bar of which has a spit basket applied thereto made in accordance with my invention;

Fig. 2 is a perspective view of the spit basket removed and shown opened up with the hinged front wall swung down and the adjustable top panel in an upwardly inclined position with respect to the fixed back wall, with which it is detachably connectible in any one of five different positions;

Fig. 3 is a cross-section through the basket taken on the line 3—3 of Fig. 1, and Fig. 4 is a perspective corner detail of the basket illustrating the snap lock fastening for the ends of the hinged front wall.

The same reference numerals are applied to corresponding parts throughout the views.

Referring to the drawing, the reference numeral 5 designates the spit basket of my invention, which is rectangular in form and of wire construction throughout with the exception only of the two sheet metal straps 6 that are welded to the bottom of the basket at opposite ends on the longitudinal center line thereof and have U-shaped portions 7 intermediate the ends thereof defining aligned eyes or bearings in which the rotary spit bar 8 of the grill 9 is adapted to be entered and fastened by means of set screws 10. The mounting of the basket 5 in the manner shown is of advantage not only from the standpoint that the bar 8 is outside the basket and will not therefore interfere with the arrangement of food in the basket, but also from the standpoint that the basket may be attached to various models of grills having manually or motor-driven spit bars, the only requirement being that the bar be small enough to pass through the eyes 7 for connection with the basket. The spit bar 8 may be turned by means of a hand crank on one end or by means of a sprocket as indicated at 11 in Fig. 1, driven by a chain 12 extending to a reduction gear box (not shown), the in-put shaft of which is driven at one speed by an electric motor and the out-put shaft of which is driven at a greatly reduced speed and carries a sprocket thereon connected with chain 12.

The basket 5 comprises a rectangular wire tray 13 having fixed parallel end walls 14 and 15 in right angle relationship to the bottom 16 and a fixed back wall 17 also in right angle relationship to the bottom 16, a front wall 18 being hingedly connected to the front of the tray as indicated at 19 and arranged to be locked at its ends detachably to the adjacent end walls 14 and 15 by means of wire snap lock projections 20, holding the hinged front 18 in the closed position. A wire top panel 21 is insertable in the tray 13 in any one of five positions of different elevation with respect to the bottom 16, the panel 21 having four hook-shaped ears 22 projecting on one side for hook-in engagement under either one of four equally spaced wires 23–26 provided on the back wall 17 in parallel relationship to the bottom 16 or under the top wire 27 on the back wall 17, depending upon what thicknesses of food, indicated at 28 in Fig. 3, is to be prepared. The five wires 23–27 constitute a fixed rack, the adjustment with respect to which serves to determine five different elevations of the panel 21 in evenly spaced settings at different elevations with respect to the bottom 16. In a similar manner, there are four wires 23'–26' on the hinged front wall 18 in the same evenly spaced relation, and a top wire 27' on the hinged front wall 18 which constitute a hinged rack to cooperate with three straight ears 22' projecting from the adjacent side of the panel 21 for support of this side of the panel at the selected elevation on the hinged front wall 18. When the upwardly bent ears 22 are hooked under the selected wire on the back wall 17, the panel 21 is thereby hingedly connected with the back wall 17 in that position and cannot shift, because the rear end 29 of the panel abutting the upwardly extending wires 30 in the back wall 17 limit movement one way and the hooks on the ears 22 limit movement the other way. The panel 21 can therefore be swung downwardly without fear of its becoming disconnected from the back wall to a position parallel to the bottom 16 preparatory to entry of the ears 22' under the appropriate wire on the hinged front wall 18, after which the hinged front 18 can be locked in closed position by snap fastening of the lock projections 20 on the end walls 14 and 15.

In operation, the basket is easily fastened to the spit bar 8 by means of the set screws 10, and can therefore be removed just as easily for cleaning. The meat to be broiled may be placed in the basket before or after it is mounted on the bar, the latter being disposed outside the basket completely, where it does not interfere in any way with the things put in the basket. Everything stays put in the basket if the top panel 21 is set properly in relation to the thickness of the pieces, thus insuring even broiling. Nothing can drop out in the turning of the basket with the spit bar. For a thicker piece, like that indicated in dotted lines at 28' in Fig. 3, the panel 21 can be inserted at a higher elevation, as shown in dotted lines in Fig. 3, this being the next to the highest setting possible for panel 21. The same advantages are obtained in all positions of adjustment of the device.

It is believed the foregoing description conveys a good understanding of the objects and advantages of my invention. The appended claims have been drawn to cover all legitimate modifications and adaptations.

I claim:

1. A spit basket comprising a generally rectangular wire tray having a bottom wall and upwardly projecting back and end walls, a front wall for said tray hinged to the bottom wall to swing upwardly to closed position, the back and front walls having parallel wires that are parallel to the bottom wall and in different vertically spaced relation with respect thereto, a generally rectangular wire panel serving as a closure for the top of said tray having means on opposite sides for detachable connection of the panel with selected wires in the front and back walls, whereby to mount said panel in any one of a plurality of positions in spaced relation to the bottom wall, and means for releasably locking said front wall in closed position.

2. A spit basket as set forth in claim 1 including means disposed on the longitudinal center line of the tray on the under side of the bottom wall for detachable connection of the basket with a spit bar for rotation of the basket.

3. A spit basket as set forth in claim 1 wherein the means on one side of the panel for detachable connection with selected wires in the back wall comprises hook shaped projections, whereby said panel is pivotally connectible with the back wall.

4. A spit basket as set forth in claim 1 wherein the means on one side of the panel for detachable connection with selected wires in the back wall comprises hook shaped projections, whereby said panel is pivotally connectible with the back wall, the means on the other side of the panel for detachable connection with selected wires in the hinged front wall comprising projections engageable under said wires.

5. A spit basket comprising a generally rectangular wire tray having longitudinally extending wires in the bottom and having upwardly bent end portions defining opposed end walls with vertically extending wires therein, there being also a back wall on said tray with horizontally extending wires therein in vertically spaced relation, a wire front wall hinged to the front of the bottom of said tray to swing upwardly to closed position, spring fastener projections on the opposite ends of said front wall for snap engagement on the vertical wires of said end walls to fasten said front wall releasably in closed position, said front wall having horizontally extending wires therein in similarly spaced relation as the horizontal wires in the back wall, and a food retaining and holding panel of wire construction having on opposite sides thereof projecting ears arranged for engagement selectively under either of the horizontal wires of the back and front walls to accommodate food of different thickness between said panel and the bottom of the tray.

6. A spit basket as set forth in claim 5 including means disposed on the longitudinal center line of the tray on the under side of the bottom wall for detachable connection of the basket with a spit bar for rotation of the basket.

7. A spit basket as set forth in claim 1 including means disposed on the longitudinal center line of the tray at the opposite ends thereof for detachable connection of the basket with a spit bar for rotation of the basket.

8. A spit basket as set forth in claim 5 including means disposed on the longitudinal center line of the tray at the opposite ends thereof for detachable connection of the basket with a spit bar for rotation of the basket.

9. A spit basket comprising a generally rectangular wire tray having a bottom wall and upwardly projecting side walls, a generally rectangular wire panel insertable and adjustable in said tray between the side walls thereof to different elevations with respect to the bottom wall, and means for holding said panel releasably in any one of a plurality of adjusted positions in spaced relation to the bottom wall comprising a fixed rack means on one side of said tray with which one longitudinal edge portion of said panel is detachably interengageable at different elevations of said panel, and hinged rack means on the opposite said of said tray swingable relative to said tray toward and away from the adjacent longitudinal edge portion of said panel and interengageable therewith at different elevations of said panel with respect to the bottom wall of said tray, said last mentioned hinged rack means having means for holding the same releasably in panel supporting position, the fixed rack means and the hinged rack means both comprising spaced substantially parallel wires that are parallel to the bottom wall and in different vertically spaced relation with respect thereto, the panel having projections on the opposite longitudinal edge portions thereof engageable between said wires to mount said panel in any one of a plurality of positions in spaced relation to the bottom wall of said tray.

10. A spit basket comprising a generally rectangular wire tray having a bottom wall and upwardly projecting side walls on three sides, a hinged side wall for the fourth side swingable upwardly to closed position, the hinged side wall and the side wall opposite the same having thereon vertical rack means, a generally rectangular top closure member insertable and adjustable in said tray to different elevations with respect to the bottom wall, said top closure member having means on the opposite longitudinal edge portions thereof interengageable with the fixed rack means and the hinged rack means on said fixed side wall and hinged side wall opposite the same, whereby the closure is supported in vertically spaced relation with respect to the bottom wall, and means for holding said hinged wall releasably in closed position.

References Cited in the file of this patent

UNITED STATES PATENTS

| | | |
|---|---|---|
| 961,543 | Sidgreaves | June 14, 1910 |
| 2,234,596 | Heilman | Mar. 11, 1941 |
| 2,682,830 | Kupchik | July 6, 1954 |
| 2,839,989 | Persinger | June 24, 1958 |